United States Patent
Gerking et al.

[11] Patent Number: 6,162,837
[45] Date of Patent: Dec. 19, 2000

[54] METHOD AND DEVICE FOR THE RECOVERY OF LINEAR POLYESTER

[75] Inventors: Lüder Gerking; Rainer Hagen; Dieter Otto Taurat, all of Berlin, Germany

[73] Assignee: Karl Fischer Industrieanlagen GmbH, Germany

[21] Appl. No.: 09/262,883

[22] Filed: Mar. 8, 1999

[30] Foreign Application Priority Data

Mar. 12, 1998 [DE] Germany ............ 198 11 280

[51] Int. Cl.⁷ ............................ C08J 11/10
[52] U.S. Cl. ............................ 521/48; 521/485
[58] Field of Search ............ 521/48.5, 48; 524/101, 524/141, 176.1, 920

[56] References Cited

U.S. PATENT DOCUMENTS 4,578,502  3/1986  Cudmore .................. 560/79
5,451,611  9/1995  Chilukuri et al. ......... 521/48.5
5,756,554  5/1998  Fisher ..................... 521/48.5

FOREIGN PATENT DOCUMENTS 116251  11/1975  Germany.

Primary Examiner—Edward J. Cain
Assistant Examiner—Kataryna Wyrozebski
Attorney, Agent, or Firm—Young & Basile, P.C.

[57] ABSTRACT

A method and device for recovering linear polyesters, such as PET and PBT, from polyester waste of the most varied form, in a continuous manner, in which undried or not dried-through waste is melted, the polymer chains being hydrolytically degraded by adhering moisture, and in which diol, corresponding to the basic constitutional unit of the polymer, is added to the melt resulting in glycolytic degradation, and the melt so treated is further condensed to the desired degree of polymerization.

15 Claims, 1 Drawing Sheet

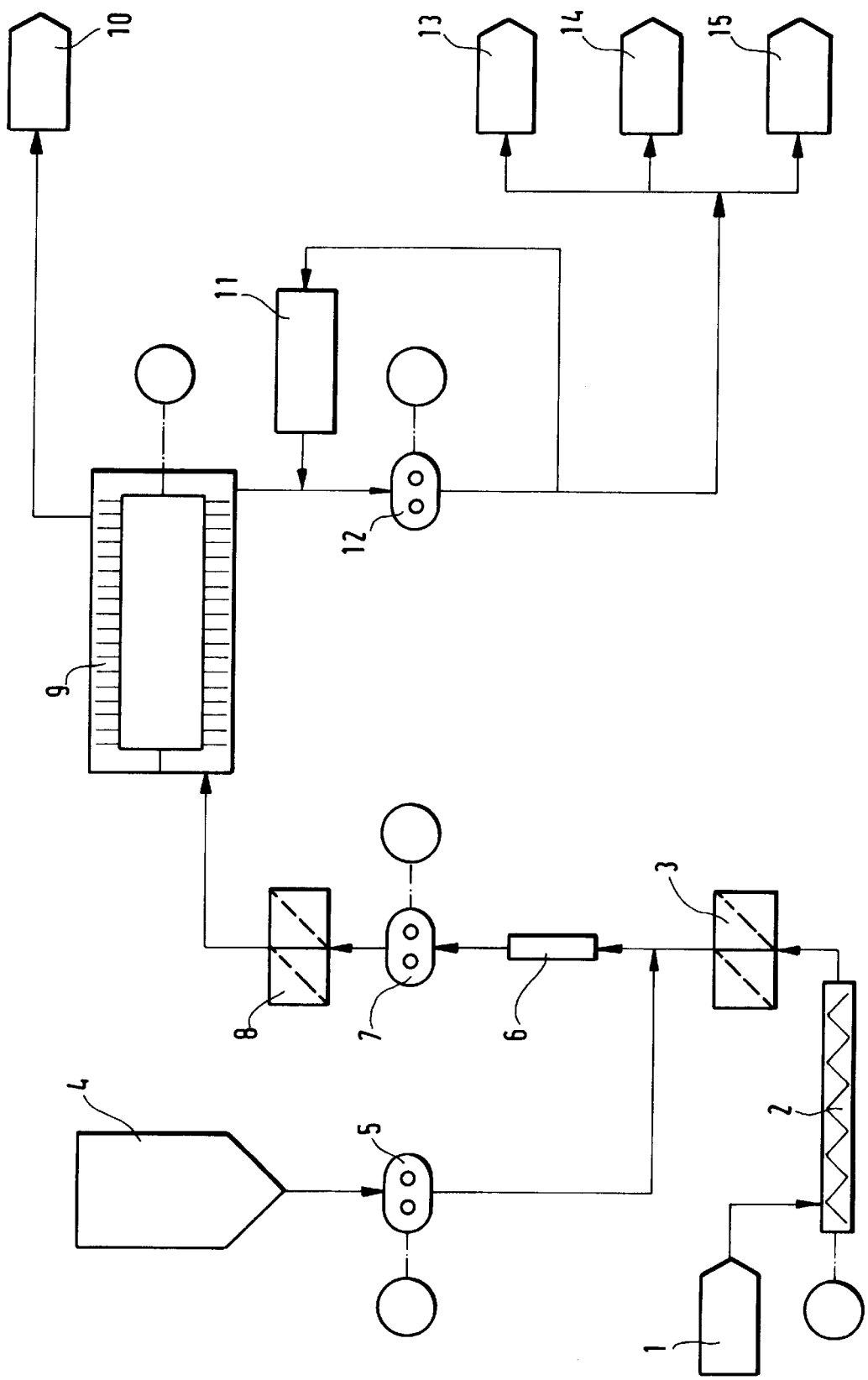

METHOD AND DEVICE FOR THE RECOVERY OF LINEAR POLYESTER

BACKGROUND OF THE INVENTION

The invention relates to a method of recovering linear polyester, such as PET and PBT, from the waste of same, and a device for carrying out the method.

Unlike many other meltable thermoplastic plastics such as polyethylene, polypropylene or polystyrene, linear polyesters such as polyethylene terephthalate cannot be processed by simple melting and regranulation to make a reusable raw material for higher quality requirements, because polyesters are hydrolytically degraded during melting by the moisture which always adheres, unless they have been previously dried. On the other hand the breakdown of the polymer chains by hydrolysis is reversible on polyesters, by polycondensation being carried out through suitable reaction conditions such as vacuum, high temperature and stirring, and the reaction water formed being removed. In contrast to the other plastics mentioned, in polyesters even the breakdown of the molecule chains caused by thermal or oxidative degradation can be repaired.

Polyethylene terephthalate (PET) as waste is frequently marked by an increased concentration of carboxyl terminal groups in relation to intact PET and a depletion of glycol ester terminal groups. The cause of this is first and foremost the thermal degradation which is unavoidable during melting and during the processing from the melt. This leads to the fact that in usual regranulating processes the chain length of the PET, measured by the intrinsic solution viscosity (i.v.) decreases; if the behaviour of the PET in repeated regranulation and reuse is observed, as can be expected in intensive recycling, it can be ascertained that after roughly the third regranulation, the intrinsic solution viscosity has sunk so far, that the material is unusable. The intrinsic solution viscosity can be raised again by solid-phase postcondensation of the PET, this measure coming up against limits, however, since the carboxyl terminal groups have in the meantime increased and the glycol ester terminal groups have decreased. The greater the COOH/OH ratio, the lower the intrinsic solution viscosity which may be achieved through postcondensation, and the higher the COOH concentration of the postcondensation product.

Methods of recycling PET are known, in which the irregular waste is crushed and compacted in such a way that the parts of the waste so treated can be led continuously through shaft or other dryers, in order to achieve complete drying of the parts. Thereafter the melting and postcondensation are carried out. This method has the disadvantage that the drying of the waste is very expensive as a result of the extent of the plant and the energy consumption, and that hydrolytic degradation cannot be completely avoided, even if the waste is dried.

With these methods, the degree of polycondensation which may be obtained in the end product depends on the quality of the polyester waste used as raw material, in particular on its intrinsic solution viscosity (i.v.) and its COOH concentration. The end product from this method is therefore excluded from many applications which require a certain degree of polycondensation. Such products must therefore be described as inferior.

These methods are moreover not in the position to compensate for the loss of glycol ester terminal groups which increases with time and which is unavoidable in the repeated recycling of polyester, especially in the practically closed circuit.

The purpose underlying the invention is to create a method and a device for recovering linear polyester with simultaneous hydrolytic and glycolytic degradation, by means of which a recycled polyester of high quality should be obtained, and so that recycling is possible even in the closed circuit, it being intended that the plant size and the energy consumption should be kept small. In particular, it is the purpose of the invention to produce a polyester with exactly the degree of polycondensation which is necessary for the respective application, independently of the quality (i.v., concentration of carboxyl terminal groups) of the raw polyester.

SUMMARY OF THE INVENTION

The present invention addresses and solves the above-mentioned problems and meets the enumerated objects and advantages, as well as others not enumerated.

Corresponding to the present invention, undried waste is led into an extruder by being melted, hydrolytic degradation occurring in the melt. The waste only needs to be precrushed sufficiently for it to be able to pass without any problem through the inlet aperture of the shredding device connected upstream of the extruder. To the melt is added diol, for example ethylene glycol, corresponding to the basic constitutional unit for the polymer to be treated, for example PET, and then the melt is further condensed in a reactor, similar to the end reactors in continuous polyester polycondensation plants to the degree of polycondensation desired for processing. Thus the hydrolytic degradation of the polyester is acceptable and diol additives are added in the stoichiometrically necessary amount to obtain in a melt postcondensation the desired polyester with its molecular weight raised again. The partial glycolysis of the polymer, for example PET, caused by the addition of diol, for example ethylene glycol, lowers the ratio of the concentration of COOH/OH terminal groups such that in the following melt postcondensation, the desired intrinsic solution viscosity can be unreservedly achieved. Thus the end product maybe used for the usual applications such as threads, films and bottles and is comparable with a polyester produced from the original monomers.

As a result of the purposeful control and the temperature of the degradation regarding the degree of polymerization, together with the glycolytic degradation to limit values of between 15 and 35, adaptation to the desired parameters of the end product can be undertaken.

Advantageously, the diol is metered in such a way that the ratio of the COOH/OH terminal groups at the entrance of the postcondensation reactor lies between 0.3 and 0.1, which makes possible an optimisation of the process conditions.

In an advantageous manner, the melt is filtered before and/or after the metered addition of diol, since the melt at that point in time has the lowest relative molar mass and thus the lowest viscosity, and this results in lower outlay on filter pressure and filter area, i.e. the energy and apparatus costs can be reduced.

BRIEF DESCRIPTION OF THE DRAWINGS

An embodiment, given by way of example, of the device according to the invention is shown in the drawing and is explained in greater detail, together with the method, in the following description. The only FIGURE shows a diagrammatic construction of the device according to the invention.

DESCRIPTION OF THE PREFERRED EMBODIMENT

The method according to the invention for recovering linear polyesters, for example PET, can be used for carefully sorted waste in the most varied form, i.e. the waste can be present in the form of bottle scrap, fibres and threads, films and spunbonded nonwovens, with trimmings or whole webs, and as lumps of melt. Dirty waste can be washed before processing and larger pieces of polymer can be coarsely precrushed. Also suitable as raw material are coarsely precrushed drinks bottles made of PET which have been freed of paper and adhesive residue through the sorting of extraneous substances and other polymers and through washing with water. The water adhering to the surface as a result of washing can be removed in simple dryers, without the drying going so far that moisture diffuses from the interior of the polymer.

The plant shown in the figure has as essential components a single-screw degasifying extruder 2 downstream of a shredding device 1, into which the precrushed waste is fed via a conveyor belt. The shredding device here consists preferably of a rotatable disc received in a housing, on the upper surface of which disc erected cutters are disposed transversely. The precrushed pieces of waste are homogenised, warmed up and compacted in this device, the necessary centrifugal force for tangential charging of the extruder screw being generated simultaneously as a result of the rotation of the disc. Downstream of the extruder 1, in which the waste material is melted, is connected a filter unit 3 with a mesh width of between 40 and 150 $\mu$m. The melt emerging from the filter unit 3 passes through a special static mixer 6 and then a metering pump unit 7 which guides the melt via a further filter unit 8 with a mesh width of between 20 and 30 $\mu$m into the postcondensation reactor 9. A metering pump 5 with a variable drive system meters ethylene glycol and reaction additives from a reservoir 4 into the flow of melt to the static mixer 6.

The reactor 8 is configured as a horizontal cylinder, in which is disposed a rotor fitted with discs and/or spokes. The vacuum necessary for the reaction in the end reactor is produced via a vacuum system 10 containing spray condensers and pumps. A discharge pump 12 conveys the postcondensed melt to a further processing location at which a granulator 13 and/or a spinning device 14 and/or some other treatment device 15, for example a film casting device, is provided.

The precrushed and compacted undried waste is delivered into the extruder 2, in which the waste is melted, hydrolytic degradation taking place in the melt. This degradation is carried out deliberately via the process conditions and settings. These refer to the degree of moisture in the waste and/or the temperature and/or the height of the vacuum in the extruder 2. Since the extruder 2 is a degasifying extruder, the volatile impurities emerging during the melting process can be extracted. In hydrolytic degradation, the melt reduces its molecular weight, i.e. the degree of polymerization decreases, resulting in the melt becoming less viscous and thus being able to be coarsely filtered with low outlay on pressure or filter area in the filter unit 3 with a filter strength of between 40 and 150 $\mu$m.

Ethylene glycol and other additives such as optical brighteners, colouring agents, colour pigments, stabilizers, catalysts are added to the melt via the metering pump 5, good intermixing taking place in the static mixer 6. Then, once the melt has been metered for the reactor 9, it is finely filtered (filter unit 8). By the addition of ethylene glycol, glycolytic degradation also occurs. The combined hydrolytic and glycolytic degradation, controlled via the process conditions and settings in the extruder and via the metered amount of ethylene glycol added, is carried out in a range predetermined by a lower and an upper limit, the lower limit for the degree of polymerization being 15, since below this value there is no longer any reason in using the postcondensation or end finishing reactor 9. The upper limit of the degree of polymerization lies approximately at 35, preferably 30, since otherwise the advantage of the favourable filtration would be lost.

Furthermore, a desired state of the carboxyl terminal groups COOH and of the hydroxyl terminal groups OH should be present at the entrance of the postcondensation reactor 9. The ratio of the terminal groups COOH/OH should be between 0.3 and 0.1 at the entrance of the end reactor 8. Preferably, there is provided before the end reactor 9 a melt viscosimeter, not shown, which measures the viscosity, the addition of the ethylene glycol and/or the other process parameters being controlled in dependence on the measurement result.

In the postcondensation reactor 8 a final polymerization degree of approximately 105 is achieved, by a vacuum of between 3 hPa and 1 hPa and temperatures of between 285° C. and 290° C. being provided; inside the end reactor 9, the final molecular weight is set by the melt being exposed to the vacuum in forming large surfaces, by which means the ethylene glycol easily evaporates out of the product with increasing viscosity. The melt is conveyed through the postcondensation reactor 9 by the inclination of the discs on the rotor and the dwell time is set by the rotational speed and the level. The reaction conditions are controlled in dependence on the results of the measurement of the viscosity by the viscometer 12.

At the end of the reactor, the melt leaves the reactor 9 via a discharge line which is connected to the pump 12. It can be further processed into threads in the spinning device 14 or into films in the casting device 15, or fed into a granulating unit 13.

In a special embodiment of the postcondensation reactor 8, a final polymerization degree of between roughly 150 and roughly 200 can be set. This is achieved by a vacuum of between 0.5 and 1.0 hPa, the rotor of the reactor being realised with greater material strength, such that it withstands the forces occurring with high melt viscosity. A degree of polymerization (DP) of approximately 150 permits the production of PET-bottles, whilst the product with approximately DP 200 is suitable for the manufacture of industrial yarn with high stability, high modulus and low shrinkage. Both bottles and industrial yarn can be produced from the granulated polyester by remelting in the extruder and subsequent injection moulding of the bottle preforms or spinning of the threads. Particularly economic is, however, the direct processing of the melt from the end reactor into preforms or threads, without interim processing of the melt into granules. This last way, which is known for virgin polyester, is accessible also for recycled polyester through the method according to the invention.

EXAMPLE 1

The raw material in the form of coarsely crushed, clean and carefully sorted polyester waste is fed into the extruder at a feed rate of 1300 kg/h and melted there.

The vapours are extracted from the degasifying zone of the extruder at a pressure of 200 mbar.

The electric heating of the extruder is set in such a way that the emerging melt has a temperature of 285° C.

The melt having a viscosity of 20 to 100 Pas is filtered by automatic reversible flow filters with a pore size of 130 $\mu$m. All melt lines are heated with a temperature of 290° C.

In a specially designed mixing section, 20 kg/h pre-heated glycol is then metered into and intensively mixed with the melt. By means of a controlled gear pump, the melt is filtered again in an exact amount via an easy-change filter with a pore size of 25 μm and led into the reactor.

The disc reactor has a length of 4.0 m, a diameter of 1.8 m and is fitted with altogether 21 discs of varied perforation and design. The discs are driven at a rotational speed of 1.5 $min^{-1}$. In the reactor, the level of the melt is measured and kept constant. The temperature of the reactor is 288° C. and the pressure is controlled around an average value of 1.0 mbar via the viscosity of the end product.

The vapour mixture from 17.1 kg/h EG, 1.6 kg/h water, 0.12 kg/h DEG and oligomers is condensed and led back into a recovery process.

The melt is drawn out of the reactor by means of a special wide-mouthed gear pump at a constant speed and pressed into further processing via a melt viscosimeter; the temperature is 286° C., the pressure 150 bar, the viscosity 260 Pas.

EXAMPLE 2

In a pilot plant, 25 kg/h PET granules having an intrinsic viscosity (i.v.) of 0.636 dl/g and carboxyl terminal groups of >33 mmol/kg are melted in an extruder at temperatures of 270–290° C. Then, the polymer stream is mixed with 190 g/h ethylene glycol and led to the end reactor. The end reactor has a diameter of 0.6 m and a length of 1.2 m. With a melt temperature of approx. 285° C., a vacuum of approx. 3 mbar and a rotor speed of 0.5 $min^{-1}$, an intrinsic solution viscosity in the product of i.v.=0.65 dl/g is achieved. The carboxyl terminal groups are here less than 25 mmol/kg. The liquid polymer is solidified into strands and granulated.

The PET granulate with i.v.=0.65 dl/g, produced in this manner, is melted again in a spunbonded nonwoven installation in an extruder. The polymer throughput amounts to approximately 42 kg/h. The liquid polymer is fed in by means of gear pump through nozzles having hole diameters of 0.4 mm and processed into spunbonded nonwoven with filament speeds of 4000 m/min. The titre is 3 dtex, the area weight 30 g/m². The spunbonded nonwoven is 660 mm wide.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for recovering at least one of polyethylene terephthalate and polybutylene terephthalate from polyester waste of various forms, the method comprising the steps of;

melting at least one of undried or not thoroughly dried waste, the polymer chains being hydrolytically degraded by moisture adhering to the waste;

adding to the knelt diol which corresponds to the basic constitutional unit of the polymer, resulting in glycolytic degradation, wherein the combined hydrolytic and glycolytic degradation in the degree of polymerization is controlled to values between a lower limit of 15 and an upper limit of 35; and then condensing the melt to a desired degree of polymerization;

wherein the method is performed in a continuous manner.

2. The method according to claim 1 wherein the diol is added to the melt in such an amount that the ratio of the concentration of COOH/OH terminal groups of the melt before the postcondensation lies between 0.3 and 0.1.

3. The method according to claim 1, further comprising the step of filtering the melt before and/or after the metered addition of the diol.

4. The method according to claim 3, further comprising the steps of:

coarsely filtering the melt with a filter size of between 40 and 150 μm before the metered addition of diol; and finely filtering the melt with a filter size of between 20 and 30 μm before the postcondensation.

5. The method according to claim 1, further comprising the step of coarsely precrushing and/or compacting the polymer waste before the melting.

6. The method according to claim 1, further comprising the step of washing the waste before the melting.

7. The method according to claim 1, wherein the waste includes a mixture of waste from various origins.

8. The method according to claim 1, further comprising the step of adding to the melt additives selected from the group consisting of optical brighteners, coloring agents, color pigments, stabilizers, catalysts, and mixtures thereof.

9. The method according to claim 8 wherein the additives are added with the diol and the constituents are homogeneously intermixed with the melt.

10. The method according to claim 8 wherein the additives are mixed in their entirety or partially during the melting of the waste.

11. The method according to claim 1 wherein the viscosity of the melt is measured before the postcondensation and that the metered addition of the diol and/or the temperature and/or the vacuum during melting are controlled in dependence on the measurement result.

12. A method for recovering linear polyesters comprising the steps of:

melting polyester waste and extracting volatile constituents therefrom, the polymer chains being hydrolytically degraded by moisture adhering to the waste;

filtering the melt;

metering the addition of diol to the melt, resulting in glycolytic degradation, wherein the combined hydrolytic and glycolytic degradation in the degree of polymerization is controlled to values between a lower limit of 15 and an upper limit of 35;

mixing and homogenizing the melt;

condensing the melt to a desired degree of polymerization; and extracting and conveying the melt to be further processed.

13. The method according to claim 12 further comprising the step of:

crushing, homogenizing and compacting the waste before melting the waste, wherein the step of crushing, homogenizing and compacting the waste generates a necessary force for charging the step of melting the waste.

14. The method according to claim 12 further comprising the step of:

filtering the melt a second time before the step of condensing the melt, wherein said second filtering means has a filtering size of between 20 and 30 μm and the first filtering means has a filtering size between 40 and 150 μm.

15. A method for recovering linear polyester from polyester waste of various forms, the method comprising the steps of:

melting at least one of undried or not throroughly dried waste, the polymer chains being hydrolytically degraded by moisture adhering to the waste;

adding to the melt diol which corresponds to the basic constitutional unit of the polymer, resulting in glycolytic degradation, wherein the combined hydrolytic and glycolytic degradation in the degree of polymerization is controlled to values between a lower limit of 15 and an upper limit of 35; and then condensing the melt to a desired degree of polymerization;

wherein the method is performed in a continuous manner.

* * * * *